(12) United States Patent
Chang et al.

(10) Patent No.: US 7,779,227 B2
(45) Date of Patent: Aug. 17, 2010

(54) MEMORY MANAGEMENT APPARATUS AND METHOD FOR OPTICAL STORAGE SYSTEM

(75) Inventors: Hui-Huang Chang, Hsin-Chu Hsien (TW); Yi-Chih Huang, Hsin-Chu (TW); Feng-Cheng Liu, Taipei (TW)

(73) Assignee: Realtek Semiconductor Corp., Hsinchu (TW)

( * ) Notice: Subject to any disclaimer, the term of this patent is extended or adjusted under 35 U.S.C. 154(b) by 429 days.

(21) Appl. No.: 11/838,235

(22) Filed: Aug. 14, 2007

(65) Prior Publication Data

US 2008/0046645 A1    Feb. 21, 2008

(30) Foreign Application Priority Data

Aug. 18, 2006    (TW) .............................. 95130541 A

(51) Int. Cl.
*G06F 12/00* (2006.01)
(52) U.S. Cl. .................... 711/220; 711/111; 711/4; 711/E12.07
(58) Field of Classification Search .................. None
See application file for complete search history.

(56) References Cited

U.S. PATENT DOCUMENTS

| 6,584,557 B1 * | 6/2003 | Taylor ......................... 711/220 |
| 6,836,835 B2 * | 12/2004 | Haller et al. ................. 711/201 |
| 6,901,478 B2 * | 5/2005 | Bak et al. .................... 711/114 |
| 7,224,885 B1 * | 5/2007 | Xie et al. ...................... 386/68 |
| 2001/0016887 A1 * | 8/2001 | Toombs et al. ............... 710/102 |
| 2005/0078577 A1 | 4/2005 | Horie | |

FOREIGN PATENT DOCUMENTS

| TW | 261687 | 11/1995 |
| TW | 200611264 | 4/2006 |

* cited by examiner

*Primary Examiner*—Matt Kim
*Assistant Examiner*—Hamdy S Ahmed
(74) *Attorney, Agent, or Firm*—Thomas, Kayden, Horstemeyer & Risley, LLP

(57) ABSTRACT

A memory management apparatus and a related method thereof for accessing digital versatile disc(DVD) data stored in a memory device are disclosed. The memory management apparatus includes an address mapping module, coupled to a bus, for receiving a logic address from the bus and for generating a physical address according to the logic address, and an access control module, coupled to the address mapping module and the memory device, for accessing the digital versatile disc data according to the physical address.

18 Claims, 4 Drawing Sheets

MEMORY MANAGEMENT APPARATUS AND METHOD FOR OPTICAL STORAGE SYSTEM

BACKGROUND OF THE INVENTION

1. Field of the Invention

The present invention relates to memory management, and more particularly, to a memory management apparatus and method for accessing digital versatile disc data.

2. Description of the Prior Art

In recent years, data storage capacity of storage media has increased considerably. Compared with other storage media, optical discs have the advantages of low price, small size, low error rate, durability, and high-density storage. Optical discs are commonly divided into two types: compact discs (CDs) and digital versatile discs (DVDs), wherein the digital versatile discs have the higher storage capacity between the two.

Digital versatile disc data is saved on the disc in a unit called a "sector". Each sector has 13 data lines, and each data line has 182 bytes. Out of the 182 bytes, the first 172 bytes are data to be saved, and the latter 10 bytes contain conventional error correction code (ECC). Furthermore, every 16 sectors constitute a "block"; so each block has a data storage capacity of 32 k bytes in total.

When an optical disc system reads data on the digital versatile disc, the data should first be copied into a memory device of the optical disc system in sectors. Because the sector size of the digital versatile disc data is different from the size of the storage unit in the conventional memory device (for example, 128 bytes per storage unit), it becomes inevitable, when copying data on the digital versatile disc into the memory device, to either divide up the data of a sector in order to fully utilize all of the storage space in the memory device; or otherwise, to leave part of the storage space unused in the memory device in order to store only one complete sector of the digital versatile disc data into one storage unit at a time. The above-mentioned two approaches have their respective advantages and disadvantages. The first approach can save the data storage space, but if the digital versatile disc data is to be accessed, it requires more complicated computing processes to obtain a physical data address. Adopting this approach not only increases workload of the system programmer in the developing phase, it also requires that during operation, each and every data processing module in the optical disc system repeats said computing processes to obtain the address where the digital versatile disc data is stored. The second approach avoids said computing processes, but in turn decreases the utilization rate of the memory device.

SUMMARY OF THE INVENTION

It is therefore one of the objectives of the present invention to provide a memory management apparatus and method to reduce the waste of the data storage space and at the same time allow each data processing module easy access to the digital versatile disc data.

According to one aspect of the present invention, a memory management apparatus for accessing digital versatile disc data stored in a memory device is disclosed. The memory management apparatus comprises: an address mapping module, coupled to a bus, for receiving a logic address from the bus and generating a physical address according to the logic address; and an access control module, coupled to the address mapping module and the memory device, for accessing the digital versatile disc data according to the physical address.

According to another aspect of the present invention, a memory management method for accessing digital versatile disc data stored in a memory device is also disclosed. The memory management method comprises: receiving a logic address from a bus then generating a physical address according to the logic address; and accessing the digital versatile disc data according to the physical address.

Therefore, any of the data processing modules coupled to the bus can access digital versatile disc data stored in the memory device with a logic address, and the data in the memory device are accessed by means of the address mapping module operative to convert the logic address into a physical address. Because the logic address is defined according to the data storage format of digital versatile disc data, for the data processing modules the logic address is more intuitive and recognizable than the physical address. Additionally, the work efficiency of programmers is greatly improved.

These and other objectives of the present invention will be understood by those of ordinary skill in the art after reading the following detailed description of the preferred embodiments that is illustrated in the various figures and drawings.

DETAILED DESCRIPTION

Figure 1:
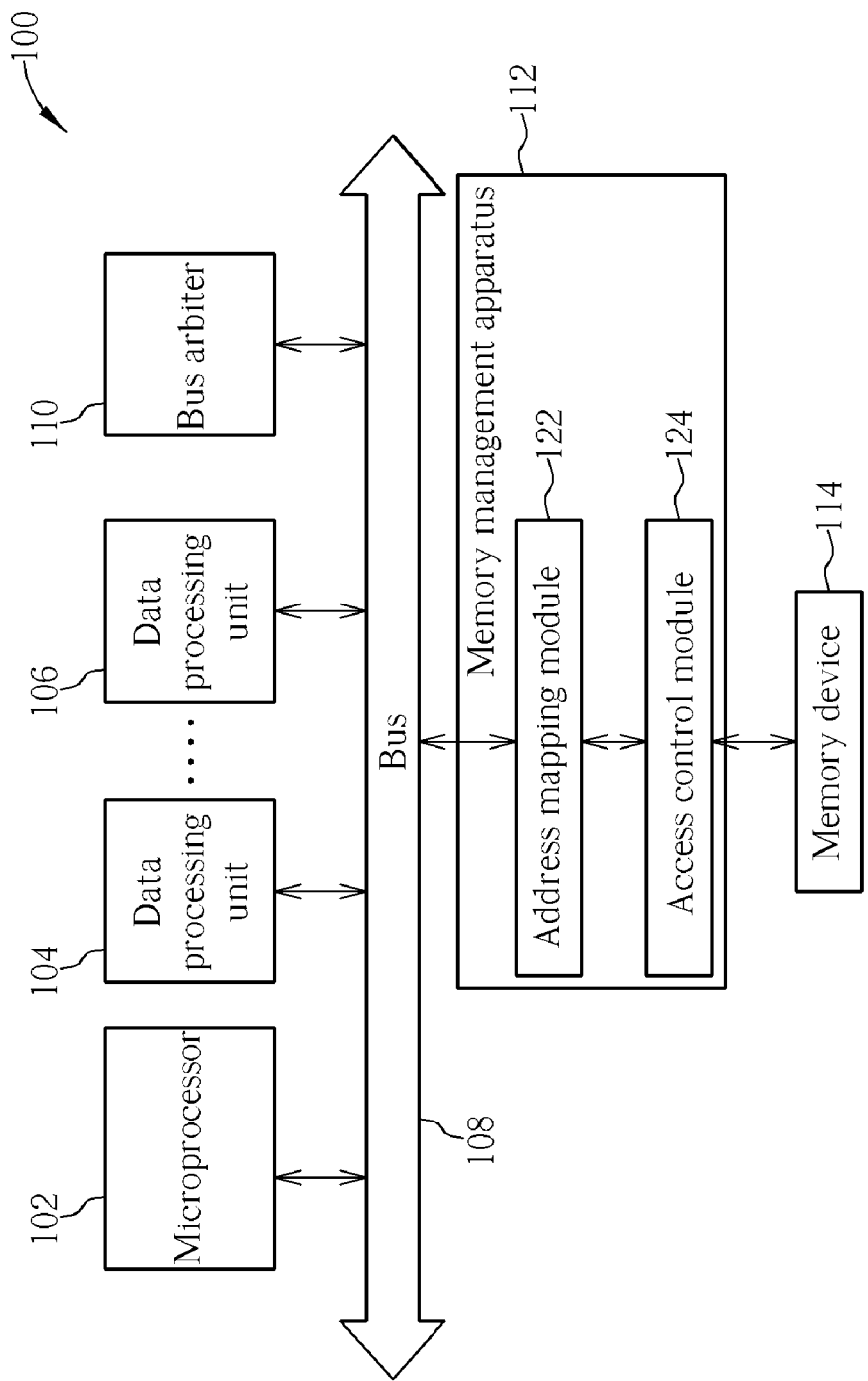
FIG. 1 is a diagram illustrating a memory management apparatus applied to an optical storage system according to an embodiment of the present invention.

Please refer to FIG. 1. FIG. 1 is a diagram illustrating a memory management apparatus 112 applied to an optical storage system 100 according to an embodiment of the present invention. The optical storage system 100 has a microprocessor 102, a plurality of data processing units, exemplified by 104 and 106, a bus 108, a bus arbiter 110, a memory management apparatus 112, and a memory device 114. The memory management apparatus 112 includes an address mapping module 122 and an access control module 124. When the microprocessor 102 or one of data processing units 104, 106 is to access digital versatile disc data D1 in the memory device 114, the first step is to send logic address AD_L corresponding to the digital versatile disc data D1 to the address mapping module 122. Next, the address mapping module 122 converts the logic address AD_L into corresponding physical address AD_P. After that, the access control module 124 converts the physical address AD_P into the row address and the column address referred to for accessing the memory device 114 and retrieving the digital versatile disc data D1. Lastly, the access control module 124 sends the requested digital versatile disc data D1 to the microprocessor 102 or data processing units 104, 106 through the address mapping module 122.

Figure 2:
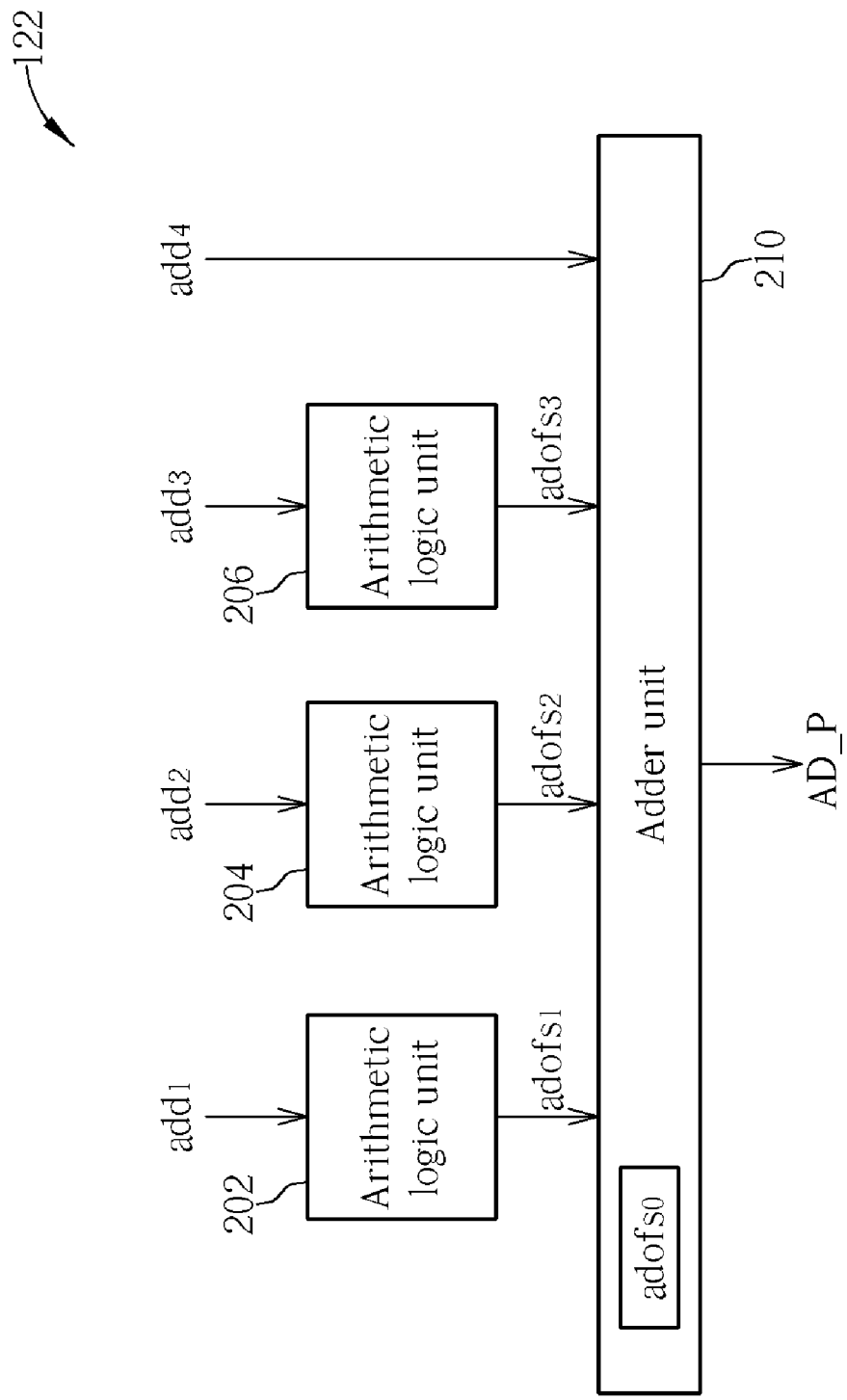
FIG. 2 is a diagram illustrating a first exemplary embodiment of the address mapping module shown in FIG. 1.

Please refer to FIG. 2. FIG. 2 is a diagram illustrating a first exemplary embodiment of the address mapping module 122 shown in FIG. 1. As shown in FIG. 2, the address mapping module 122 has a plurality of arithmetic logic units 202, 204, 206 and an adder unit 210. In the present embodiment, the logic address AD_L is composed of four numbers, for example, 01:02:12:8, respectively representing block address $add_1$, sector address $add_2$, line address $add_3$, and byte address add$_4$ corresponding to the digital versatile disc data D1. The arithmetic logic unit 202 shown in FIG. 2 is used to multiply block address add1 with the block size (i.e., 16*13*182 bytes) for generating a physical address offset adofs$_1$; the arithmetic logic unit 204 is used to multiply sector address add2 with the sector size (i.e., 13*182 bytes) for generating a physical address offset adofs$_2$; and the arithmetic logic unit 206 is used to multiply line address add3 with the line size (i.e., 182 bytes) for generating a physical address offset adofs$_3$. Lastly, the adder unit 210 sums the start address of the memory device 114 adofs$_0$ shown in FIG. 1, the physical address offsets adofs$_1$, adofs$_2$, adofs$_3$, and the byte address add$_4$, to generate the physical address AD_P. The following equation illustrates the computation of the physical address AD_P:

$$AD\_P = adofs_0 + add_1*(16*13*182) + add_2*(13*182) + add_3*182 + add_4$$

Consequently, the access control module 124 shown in FIG. 1 can access the desired digital versatile disc data D1 according to the physical address AD_P.

Figure 3:
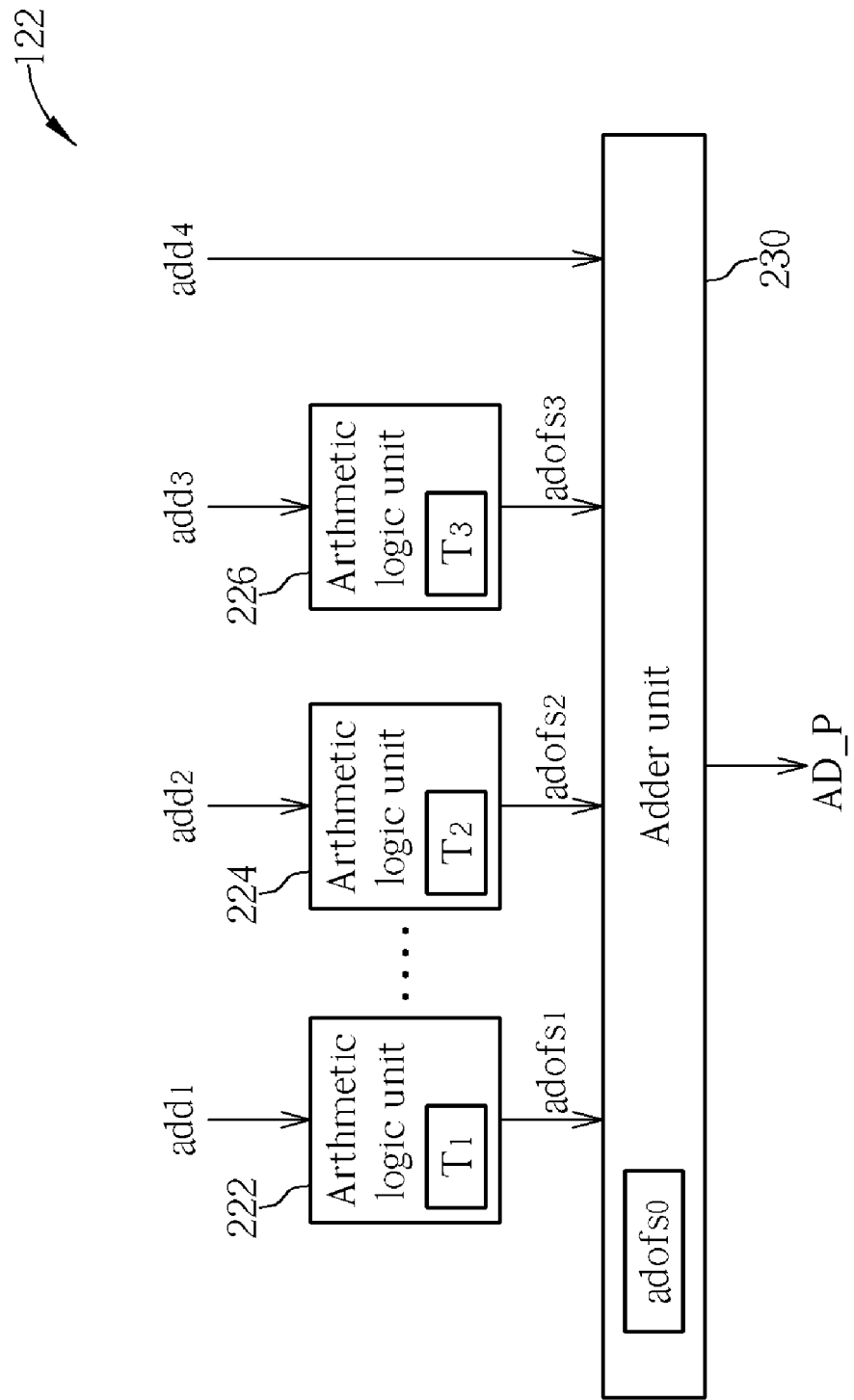
FIG. 3 is a diagram illustrating a second exemplary embodiment of the address mapping module shown in FIG. 1.

Please refer to FIG. 3. FIG. 3 is a diagram illustrating a second exemplary embodiment of the address mapping module 122 shown in FIG. 1. As shown in FIG. 3, the address mapping module 122 has a plurality of arithmetic logic units 222, 224, 226 and an adder unit 230. Compared with the arithmetic logic units 202, 204, and 206 shown in FIG. 2, the arithmetic logic units 222, 224 and 226 are implemented by software, and the arithmetic logic units 222, 224 and 226 generate physical address offsets adofs$_1$, adofs$_2$, and adofs$_3$ by respectively referring to lookup tables T1, T2 and T3 using the block address add$_1$, sector address add$_2$, and line address add$_3$. Afterwards, the adder unit 230 sums the start address of memory device 114 adofs$_0$ shown in FIG. 1, the physical address offsets adofs$_1$, adofs$_2$, adofs$_3$, and the byte address add$_4$ to generate the physical address AD_P. Because the arithmetic logic units 222, 224, 226 and adder unit 230 in the address mapping module 122 are implemented by software in this embodiment, the cost of hardware can be saved. Please note that the number and the format of the logic address in the present invention are not limited by the above-mentioned two embodiments, and any logic addressing mechanism, which determines physical addresses through computing or referring to a lookup table, can be used to define the logic address in the present invention.

Figure 4:
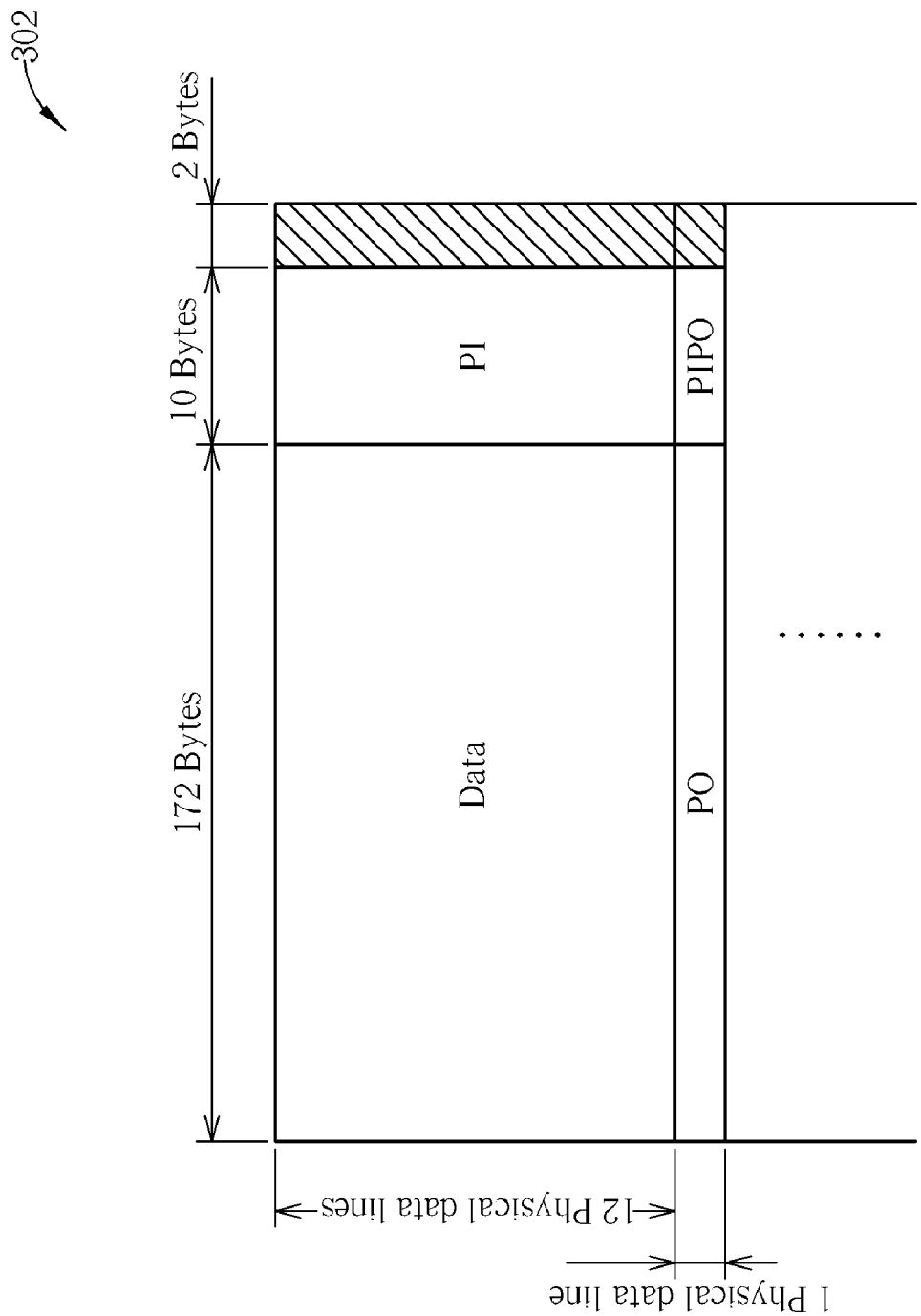
FIG. 4 is a diagram illustrating a memory device storing digital versatile disc data.

In addition, the above-mentioned embodiments can store digital versatile disc data without dividing up a sector. Please refer to FIG. 4. FIG. 4 is a diagram illustrating a memory device 302 storing digital versatile disc data. The memory device 302 is a 16-bit synchronous dynamic random access memory (SDRAM) for storing digital versatile disc data. Due to the fact that the minimum unit that can be accessed in the synchronous dynamic random access memory is 8 bytes, 23 minimum units are regarded as a physical data line. As a result, the size of each conventional physical data line is 184 bytes. Therefore, it takes a 13*184-byte memory space to store a sector of digital versatile disc data. Due to the fact, however, that the line size of digital versatile disc data is only 182 bytes, there is a 13*2-byte memory space (marked by oblique lines) left unused when a sector of digital versatile disc data is stored. For this reason, only about 10% of memory storage capacity is wasted when this disclosed memory allocating method is used. When reading any physical data line, the memory management apparatus of the present invention can make use of the access time of the last two bytes to compute the address of the next data, thereby decreasing the total time spent upon accessing the digital versatile disc data.

Compared with prior art implementation, the memory management apparatus of the present invention enables any data processing module coupled to the bus capable of accessing the digital versatile disc data stored in the memory device according to the logic address, and capable of accessing the data in the memory device by means of the address mapping module operative to convert the logic address into the physical address. In the present invention, the logic address is more intuitive and recognizable than the physical address for the data processing modules, so that the present invention is able to simplify the work of programmers during the programming process.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A memory management apparatus, for accessing digital versatile disc (DVD) data stored in a memory device, the memory management apparatus comprising:
    an address mapping module, coupled to a bus, for receiving a logic address comprising a first address and a second address from the bus and generating a physical address according to the logic address, the address mapping module comprising:
        a first arithmetic logic unit configured to generate a first physical address offset according to the first address;
        a second arithmetic logic unit configured to generate a second physical address offset according to the second address; and
        an adder unit configured to sum an initial memory address corresponding to the digital versatile disc data, the first physical address offset and the second physical address offset to generate the physical address; and
    an access control module, coupled to the address mapping module and the memory device for accessing the digital versatile disc data according to the physical address.

2. The memory management apparatus of claim 1, wherein the memory device comprises a plurality of first memory blocks each having a plurality of second memory blocks, the first address corresponding to a first memory block, and the second address corresponding to a second memory block in the first memory block.

3. The memory management apparatus of claim 2, wherein the first arithmetic logic unit generates the first physical address offset according to a product of the first address and a block size of the first memory block, or the second arithmetic logic unit generates the second physical address offset according to a product of the second address and a block size of the second memory block.

4. The memory management apparatus of claim 3, wherein the block size of the second memory block is one byte.

5. The memory management apparatus of claim 1, wherein the first arithmetic logic unit generates the first physical address offset by referring to a first lookup table according to the first address, and the second arithmetic logic unit generates the second physical address offset by referring to a second lookup table according to the second address.

6. The memory management apparatus of claim 1, wherein the physical address is hexadecimal.

7. The memory management apparatus of claim 1 being positioned in an optical storage system.

8. The memory management apparatus of claim 1, wherein the access control module is configured to convert the physical address into a row address and column address.

9. The memory management apparatus of claim 1, wherein the address mapping module further comprises:
- a third arithmetic logic unit configured to generate a third physical address offset according to a third address, wherein the third address is a portion of the logic address; and
- wherein the adder unit is further configured the third physical address offset and a fourth physical address to generate the physical address.

10. The memory management apparatus of claim 9, wherein:
- the first arithmetic logic unit generates the first physical address offset by multiplying the first physical address by a block size;
- the second arithmetic logic unit generates the second physical address offset by multiplying the second physical address by a sector size;
- the third arithmetic logic unit generates the third physical address offset by multiplying the third physical address by a line size; and
- the fourth physical address is a line size.

11. A memory management method, for accessing digital versatile disc (DVD) data stored in a memory device, the memory management method comprising:
- receiving a logic address comprising a first address and a second address from a bus;
- generating a first physical address offset according to the first address;
- generating a second physical address offset according to the second address; and
- summing a memory initial address, corresponding to the digital versatile disc data, the first physical address offset and the second physical address offset to generate a physical address; and
- accessing the digital versatile disc data according to the physical address.

12. The memory management method of claim 11, wherein the memory device comprises a plurality of first memory blocks each having a plurality of second memory blocks, the first address corresponds to a first memory block, and the second address corresponds to a second memory block in the first memory block.

13. The memory management method of claim 12, wherein the step of generating the first physical address offset generates the first physical address offset according to a product of the first address and a block size of the first memory block, or the step of generating the second physical address offset generates the second physical address offset according to a product of the second address and a block size of the second memory block.

14. The memory management method of claim 13, wherein the block size of the second memory block is one byte.

15. The memory management method of claim 11, wherein the step of generating the first physical address offset refers to a first lookup table according to the first address to generate the first physical address offset, and the step of generating the second physical address offset refers to a second lookup table according to the second address to generate the second physical address offset.

16. The memory management method of claim 11, wherein the physical address is hexadecimal.

17. The memory management method of claim 11 being applied to an optical storage system.

18. A memory management apparatus, for accessing digital versatile disc (DVD) data stored in a memory device, the memory management apparatus comprising:
- an address mapping module, coupled to a bus, for receiving a logic address from the bus and generating a physical address according to the logic address, the address mapping module comprising:
- a first arithmetic logic unit configured to generate a first physical address offset according to a first portion of the logic address;
- a second arithmetic logic unit configured to generate a second physical address offset according to a second portion of the logic address;
- an adder unit configured to sum an initial memory address corresponding to the DVD data, the first physical address offset and the second physical address offset to generate the physical address; and
- an access control module configured to access the DVD data according to the physical address.

* * * * *